(12) United States Patent
Shenoi

(10) Patent No.: US 8,379,151 B2
(45) Date of Patent: Feb. 19, 2013

(54) SYNCHRONIZATION OF AUDIO AND VIDEO STREAMS

(75) Inventor: Kishan Shenoi, Saratoga, CA (US)

(73) Assignee: Floreat, Inc., Saratoga, CA (US)

( * ) Notice: Subject to any disclaimer, the term of this patent is extended or adjusted under 35 U.S.C. 154(b) by 55 days.

(21) Appl. No.: 13/065,585

(22) Filed: Mar. 24, 2011

(65) Prior Publication Data

US 2011/0234902 A1    Sep. 29, 2011

Related U.S. Application Data

(60) Provisional application No. 61/340,923, filed on Mar. 24, 2010, provisional application No. 61/340,922, filed on Mar. 24, 2010, provisional application No. 61/340,906, filed on Mar. 24, 2010.

(51) Int. Cl.
*H04N 9/475*    (2006.01)

(52) U.S. Cl. ........................................ 348/515; 348/512

(58) Field of Classification Search .................. 348/515, 348/512, 500, 518; 386/201, 203, 207; *H04N 5/04, H04N 9/44, 9/475*
See application file for complete search history.

(56) References Cited

U.S. PATENT DOCUMENTS

| | | | | |
|---|---|---|---|---|
| 6,744,815 | B1 * | 6/2004 | Sackstein et al. | 348/515 |
| 7,158,187 | B2 * | 1/2007 | Suzuki | 348/515 |
| 2002/0018645 | A1 * | 2/2002 | Nakamatsu et al. | 348/515 |

* cited by examiner

*Primary Examiner* — Sherrie Hsia
(74) *Attorney, Agent, or Firm* — John Bruckner PC

(57) ABSTRACT

A method includes synchronizing audio and video streams including aligning the audio path and the video path by introducing a variable delay to the audio path or the video path to substantially equalize the end-to-end delay of both the audio path and the video path. An apparatus includes a digital to analog convertor for synchronizing audio and video where the audio path and the video path are aligned by introducing a variable delay to the audio path or the video path to substantially equalize the end-to-end delay of both the audio path and the video path.

16 Claims, 11 Drawing Sheets

SYNCHRONIZATION OF AUDIO AND VIDEO STREAMS

CROSS-REFERENCES TO RELATED APPLICATIONS

This application claims a benefit of priority under 35 U.S.C. 119(e) from copending provisional patent applications U.S. Ser. No. 61/340,923, filed Mar. 24, 2010, U.S. Ser. No. 61/340,922, filed Mar. 24, 2010 and U.S. Ser. No. 61/340,906, filed Mar. 24, 2010, the entire contents of all of which are hereby expressly incorporated herein by reference for all purposes.

BACKGROUND INFORMATION

1. Field of the Invention

Embodiments of the invention relate generally to the field of digital networking communications. More particularly, an embodiment of the invention relates to methods and systems for packet switched networking that include synchronization of audio and video streams.

2. Discussion of the Related Art

The availability of a ubiquitous Internet has enabled several forms of communication between end-users. These include non-real time messaging such as e-mail; quasi-real-time applications such as "Instant Messaging" or "chat", and real-time communications such as speech (generally called Voice-over-IP or VoIP) and video (Video-over-IP). Generally speaking, video is always associated with speech to have an audio-visual call.

One of the issues associated with communication over a packet-switched network, such as the Internet, is the notion of variable delay. That is, each packet delivered from source to destination could experience a different delay. This packet-delay variation (PDV) is a major contributor to the reduction of end-user Quality of Experience (QoE). For example, the variability of delay in speech packets requires the deployment of a jitter buffer to ensure that the play-out mechanism is not starved of packet. The inclusion of a jitter buffer implies an increase in delay. For speech communication an increase in delay has detrimental effect on the QoE as perceived by the (human) end-user. An increase in one-way delay implies an increase in round-trip delay as well and this has a detrimental effect because of echo since a given level of echo becomes more annoying with increased round-trip delay.

For the video portion of the call, the one-way delay and round-trip delay are important but not that important as for the speech portion. However, what is extremely important in an audio-video call is the notion of "lip-synch". Simply put, the audio must match, reasonably well, the video in a temporal manner. The term "lip-synch" is derived from the observation that in a typical human-to-human call the movement of the lips should correspond to the sound—human beings are capable of envisioning the sound from a visual rendition of lip movement and are therefore able to distinguish whether the audio and video are aligned.

FIG. 1 provides a view of the key elements of an end-user deployment. For convenience the configuration shows an external device that provides connection to the Internet. This could be an xDSL (Digital Subscriber Line) device, a Cable Modem, a wireless router (connected to an xDSL modem or Cable Modem). From the viewpoint of the invention described here the specific method of Internet Access is not material and the invention is appropriate for all internet access schemes that can support the bandwidth required for operation of Voice-over-IP and Video-over-IP and is therefore available as prior art.

The fundamental notion of audio-video synchronization, or lack thereof, can be explained with reference to FIG. 2, below.

The source of video information is a camera ("C") or equivalent. This device generates the bits associated with the pixels that comprise each frame of video. The destination, or "sink" of video information is generally a display screen ("S"). The source of audio content is a microphone ("m") or equivalent. This device generates the bits associated with the samples of the audio signal. The destination of audio content is generally a speaker ("s").

Between the source and sink there are numerous stages of processing and transmission that add delay. For example, the video content coming from the camera is generally buffered ("$B_1$") to allow for the code executing the video signal processing to run somewhat independently of the camera speed. The buffer adds delay as does the signal processing itself ("SP-V"). The processed video signal is then packetized and in order to allow the packetization code ("P-V") to run somewhat independently of the signal-processing, a buffering arrangement is used ("$B_2$"). The video packets are launched into the network and experience a variable transit delay ("IP-V") across the network. This necessitates the introduction of a jitter buffer ("$B_3$") that adds delay as well. The packets containing the video information are then processed ("D-V") where the video information is extracted from the packet and decoded appropriately. This depacketization and signal processing adds delay. Since the processing speed may be different from the actual screen update speed, the video data is stored in a buffer ("$B_4$") from which the screen driver extracts the information to drive the actual display (screen, "S").

A similar chain of events occurs for the audio signal. The signal from the microphone ("m") is buffered ("$b_1$") and then processed ("P-A"), buffered ("$b_2$"), packetized for delivery across the network ("P-A"), delayed by the network ("IP-A"), passed through a jitter buffer ("$b_3$"), processed ("D-A") and delivered through a buffer ("$b_4$") to the driver code that delivers the signal to the speakers ("s").

The total delay experienced by the video and audio signals in their path between source and sink can be written as:

$$T_V = T_{B1} + T_{SPV} + T_{B2} + T_{PV} + T_{IPV} + T_{B3} + T_{DV} + T_{B4} \text{ (end-to-end video path)} \quad \text{(Eq. 2.1A)}$$

$$T_A = T_{b1} + T_{SPA} + T_{b2} + T_{PA} + T_{IPA} + T_{b3} + T_{DA} + T_{b4} \text{ (end-to-end audio path)} \quad \text{(Eq. 2.1B)}$$

and if $T_V \neq T_A$ then there is an absence of "lip-sync" as it is apparent that the sound (audio) and picture (video) are not in alignment. In Eq. 2.1 TV is the end-to-end video delay, and TA is the end-to-end audio path delay. The other terms are defined below with a brief explanation as to their significance:

$T_{B1}$: The buffering delay associated with the drivers that take video information from the camera and present it to the video-signal-processing block. When the camera sampling rate is synchronized to the clock rate associated with the signal processing, then the buffer delay is a constant.

$T_{SPV}$: The delay associated with the signal processing. Very often this is subsumed in the buffering operation (B2).

$T_{B2}$: The buffering delay associated with the transfer of processed (e.g. compressed or encoded) video signal information to the packetization block. This is generally a constant.

$T_{PV}$: The video information is formatted into packets for delivery into the IP network. The delay could be variable if the packet launching is done "on demand" when the packet is ready, or it could be a constant if it is known that the packet delivery will be done at a constant rate. In cases where the bit-rate of the encoded video is "constant" (the constant bit-rate or CBR mode) and the packet size is predetermined as well, then the delay in this block can be calibrated. If variable bit-rate (the VBR mode) encoding methods are employed then the delay in this block is also variable.

$T_{IPV}$: This delay includes all the delays associated with transmission of packets carrying the video information across a packet network. There are numerous contributors to this delay. At the source there is a variable delay based on the packet interface and the presence of other packets (of different services and applications) also contending for transmission bandwidth. At the receiver a similar situation could arise where incoming packets are held in receive buffers till they can be processed. This delay is also variable. Such pairs of transmit and receive delays are present in each intermediate device (e.g. switch or router) between the origination and terminating points, adding to the delay. The physical transmission of the signals between intermediate devices also introduces transmission delay. For a given route through the network this transmission delay will normally be fixed. If the route through the network is allowed to change then even this delay is variable. The delay can be viewed as the sum of a constant (fixed) part, $T_{FV}$, and a variable part, and we consider the maximum of the variable part as $T_{VV}$. Packets that are delayed by greater than this maximum values are discarded as having arrived too late to be useful.

$T_{B3}$: To address the variable transit delay through the packet network ($T_{IPV}$, above), a jitter buffer arrangement is used. The intent of this arrangement is to make the combination of jitter buffer and packet network appear as a constant delay. Arriving packets are placed in a first-in-first-out (FIFO) buffer and the read out by the signal processing block. The nominal separation of read-address and write-address is half the buffer size. That way, the effective delay of network and jitter buffer combination is (nominally) constant at ($T_{FV}$+$T_{VV}$).

$T_{DV}$: This comprises the delay introduced in the extraction of video information from received packets as well as the time involved in the signal processing associated with the decoding of the video. This delay is usually known and can be calibrated.

$T_{B4}$: The computations done to construct the video screen signal can be asynchronous to the presentation device and therefore there is the need for a buffer. $T_{B4}$ represents the associated delay.

$T_{b1}$: The buffering delay associated with the drivers that take audio information from the analog-to-digital converter (ADC) (that converts the analog signal from the microphone to digital format) and present it to the audio-signal-processing block. When the ADC sampling rate is synchronized to the clock rate associated with the signal processing, then the buffer delay is a constant.

$T_{SP4}$: The delay associated with the signal processing. Very often this is subsumed in the buffering operation (b2).

$T_{b2}$: The buffering delay associated with the transfer of processed (e.g. compressed or encoded) audio signal information to the packetization block. This is generally a constant.

$T_{P4}$: The audio information is formatted into packets for delivery into the IP network. The delay could be variable if the packet launching is done "on demand" when the packet is ready, or it could be a constant if it is known that the packet delivery will be done at a constant rate. In cases where the bit-rate of the encoded video is "constant" (the constant bit-rate or CBR mode) and the packet size is predetermined as well, then the delay in this block can be calibrated. If variable bit-rate (the VBR mode) encoding methods are employed then the delay in this block is also variable.

$T_{IP4}$: This delay includes all the delays associated with transmission of packets carrying the audio information across a packet network. (See the explanation of $T_{IPV}$.) The delay can be viewed as the sum of a constant (fixed) part, $T_{FA}$, and a variable part, and we consider the maximum of the variable part as $T_{VA}$. Packets that are delayed by greater than this maximum values are discarded as having arrived too late to be useful.

$T_{b3}$: The jitter buffer arrangement for audio that is akin to the jitter buffer arrangement for video (see $T_{B3}$). The effective delay of network and jitter buffer combination is (nominally) constant at ($T_{FA}$+$T_{VA}$).

$T_{D4}$: This comprises the delay introduced in the extraction of audio information from received packets as well as the time involved in the signal processing associated with the decoding of the audio. This delay is usually known and can be calibrated.

$T_{b4}$: The computations done to construct the audio signal can be asynchronous to the digital-to-analog (DAC) converter device that provides the analog signal to drive the speakers. Therefore there is the need for a buffer. $T_{b4}$ represents the associated delay.

Due to the nature of the human visual and auditory systems, a slight inequality can be tolerated. That is, if the difference is less than D ms (milliseconds) then the lack of alignment is moot. It is well established that D is of the order of 40 ms.

The problem statement: For proper alignment between audio and video, the end-to-end path delay for both audio and video must be the same (within about 40 ms). Lack of alignment is referred to as loss of "lip-synch" and results in a severe degradation of end-user Quality of Experience (QoE) since it is very annoying.

The general approaches to "lip-synch" that have been proposed in the industry (the prior art) are briefly described here and some of the reasons why they are not robust are explained.

One approach suggested is based on what is called "Real Time Protocol" ("RTP"). The term "RTP" is often considered a misnomer because it does not always serve the purpose for what such a term would indicate. The intent of RTP is to provide a timing reference along with the information. That is, in every RTP packet, there is a 32-bit field available for a time-stamp and a 32-bit field available to identify the synchronization source ("SSRC"). The time-stamp is used to indicate the progression of time according to the clock of the synchronization source. The difference in time-stamps between two packets provides an indication of the elapsed time according to the source clock. Often the time interval unit is chosen as the sampling interval associated with the sampling of the information signal (audio or video) and the time-stamp difference between two consecutive packets will represent the number of signal samples used to generate the packet.

The approach is depicted in FIG. 3, below. Essentially, if the video information and audio information are delivered in separate RTP streams, then there will be the notion of a "Video clock" that provides the timing to control the conversion of video into digital format in the camera by providing a reference to control the sampling frequency of the analog-to-digital conversion process in the camera. The same clock is used to generate time-stamps that are inserted into the RTP packets of the video stream in the unit labeled "P-V". Likewise, there will be the notion of an "Audio clock" that provides the timing to control the conversion of audio into digital format in the microphone by providing a reference to control the sampling frequency of the analog-to-digital conversion process in the microphone. The same clock is then used to generate time-stamps that are inserted into the RTP packets of the audio stream in the unit labeled "P-V".

The primary use for such RTP time-stamps is to establish a suitable timing-base (frequency) to control the play-back. This is shown in FIG. 3. The block labeled V-CR recovers the video sampling frequency from the time-stamps in the video RTP stream and can provide this to the playback unit labeled "S". Likewise, the block labeled A-CR recovers the sampling frequency from the time-stamps in the audio RTP stream and can provide this to the playback unit labeled "s". Using the proper recovered clock (frequency) at the playback unit ("S" and "s") is absolutely necessary for good audio/video reproduction, but note that this approach does not solve the lip-synch problem since the delays in the two paths are not addressed.

The RTP time-stamps have secondary uses as well. For example the variation in transit delay causes the time-stamps to arrive with a different time-of-arrival as would be expected from the embedded time-stamp. This difference is a measure of transit delay variation (also known as packet delay variation).

The approach used in MPEG video transmission is to generate what is called a "transport stream". As described in the relevant MPEG standard, the information is encapsulated in "MPEG frames" comprising 188 bytes. The format of these frames, the fields present therein, and the interpretation of these fields, and the manner of concatenating information over multiple MPEG frames, and other aspects of MPEG Transport Stream (abbreviated as MPEG-TS) generation are well described in the standard. Here we provide just the principle underlying the synchronization aspects of MPEG. The principle as described is also applicable to RTP but in that case there would be technical noncompliance to the published standard.

The key to the operation of MPEG-TS is the merging of information related to audio and video into a single stream in a process that is referred to in the art as multiplexing. Consequently the MPEG frames associated with video as well as audio are placed together in IP packets, typically following the RTP format. The implication of this combination is that the delay of the IP network, generally the most significant component of the end-to-end delay, is the same for both audio and video streams. This addresses a significant portion of the cause for lack of lip-synch.

Just for reference, the time-stamps included in the MPEG stream are used for frequency synchronization as well as phase synchronization. The recovered system clock is nominally equal to the send-side system clock except for a constant delay. This constant delay is of no consequence relative to lip-synch since both the audio and video will be delayed by the same amount. The key time-stamps employed are:

a. System Clock Time-Stamp ("STC"); Program Clock Reference ("PCR"). These are used to synchronize the receive-side system time clock with the sender side system time clock. This is necessary so that all other time-stamps are valid.

b. Decode Time-Stamps ("DTS") and Presentation Time-Stamps ("PTS"). These are required for the audio as well as for the video streams. These time-stamps allow the receive side to apply the signal processing at the appropriate juncture and align the decoded signals for delivery to the appropriate output device (screen for video and speakers for audio).

Note that the DTS and PTS time-stamps are key to aligning the audio and video streams. That is, DTS and PTS for the audio and video streams are the current state of the art solutions for achieving lip-synch. The DTS and PTS time-stamps generated by the send-side are continually compared with the recovered system time clock. When there is agreement, the decoding or presentation of the block of data associated with the time-stamp is initiated. This approach is valid only if the recovered system time clock is locked to the send-side system time clock (up to a constant delay) and the STC and PCR are the mechanism for achieving this condition.

The multiplexing scheme described in MPEG permits the delivery of audio and video and preserves the time alignment of the two streams from the point of multiplexing through to the receiver. However, what is does NOT do is account for differences in delay between the end-point source and point of multiplexing. With reference to FIG. 2, a delay differential comprised of $\Delta T = (T_{B1} + T_{SPV} + T_{B2}) - (T_{b1} + T_{SPA} + T_{b2})$ can remain. If $\Delta T$ is substantial, then lip-synch problems can be experienced.

SUMMARY OF THE INVENTION

There is a need for the following embodiments of the invention. Of course, the invention is not limited to these embodiments.

According to an embodiment of the invention, a process comprises: synchronizing audio and video streams including applying a time-stamp to a block of a audio buffer in an audio path; applying a time-stamp to a block of a video buffer in a video path; reading the block from the audio buffer; reading the block from the video buffer; and aligning the audio path and the video path by introducing a variable delay to one member selected from the group consisting of the audio path or the video path to substantially equalize the end-to-end delay of both the audio path and the video path. According to another embodiment of the invention, a machine comprises: a digital to analog convertor for synchronizing audio and video including. an audio buffer in an audio path, each block of the audio buffer having an audio time-stamp; and a video buffer in a video path, each block of the video buffer having a video time-stamp, wherein the audio path and the video path are aligned by introducing a variable delay to one member selected from the group consisting of the audio path or the video path to substantially equalize the end-to-end delay of both the audio path and the video path.

These, and other, embodiments of the invention will be better appreciated and understood when considered in conjunction with the following description and the accompanying drawings. It should be understood, however, that the following description, while indicating various embodiments of the invention and numerous specific details thereof, is given for the purpose of illustration and does not imply limitation. Many substitutions, modifications, additions and/or rearrangements may be made within the scope of an embodiment of the invention without departing from the spirit thereof, and embodiments of the invention include all such substitutions, modifications, additions and/or rearrangements.

BRIEF DESCRIPTION OF THE DRAWINGS

The drawings accompanying and forming part of this specification are included to depict certain embodiments of the invention. A clearer concept of embodiments of the invention, and of components combinable with embodiments of the invention, and operation of systems provided with embodiments of the invention, will be readily apparent by referring to the exemplary, and therefore nonlimiting, embodiments illustrated in the drawings (wherein identical reference numerals (if they occur in more than one view) designate the same elements). Embodiments of the invention may be better understood by reference to one or more of these drawings in combination with the following description presented herein. It should be noted that the features illustrated in the drawings are not necessarily drawn to scale.

DESCRIPTION OF PREFERRED EMBODIMENTS

Embodiments of the invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the embodiments of the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Within this application several publications are referenced by Arabic numerals, or principal author's name followed by year of publication, within parentheses or brackets. Full citations for these, and other, publications may be found at the end of the specification immediately preceding the claims after the section heading References. The disclosures of all these publications in their entireties are hereby expressly incorporated by reference herein for the purpose of indicating the background of embodiments of the invention and illustrating the state of the art.

Figure 1:
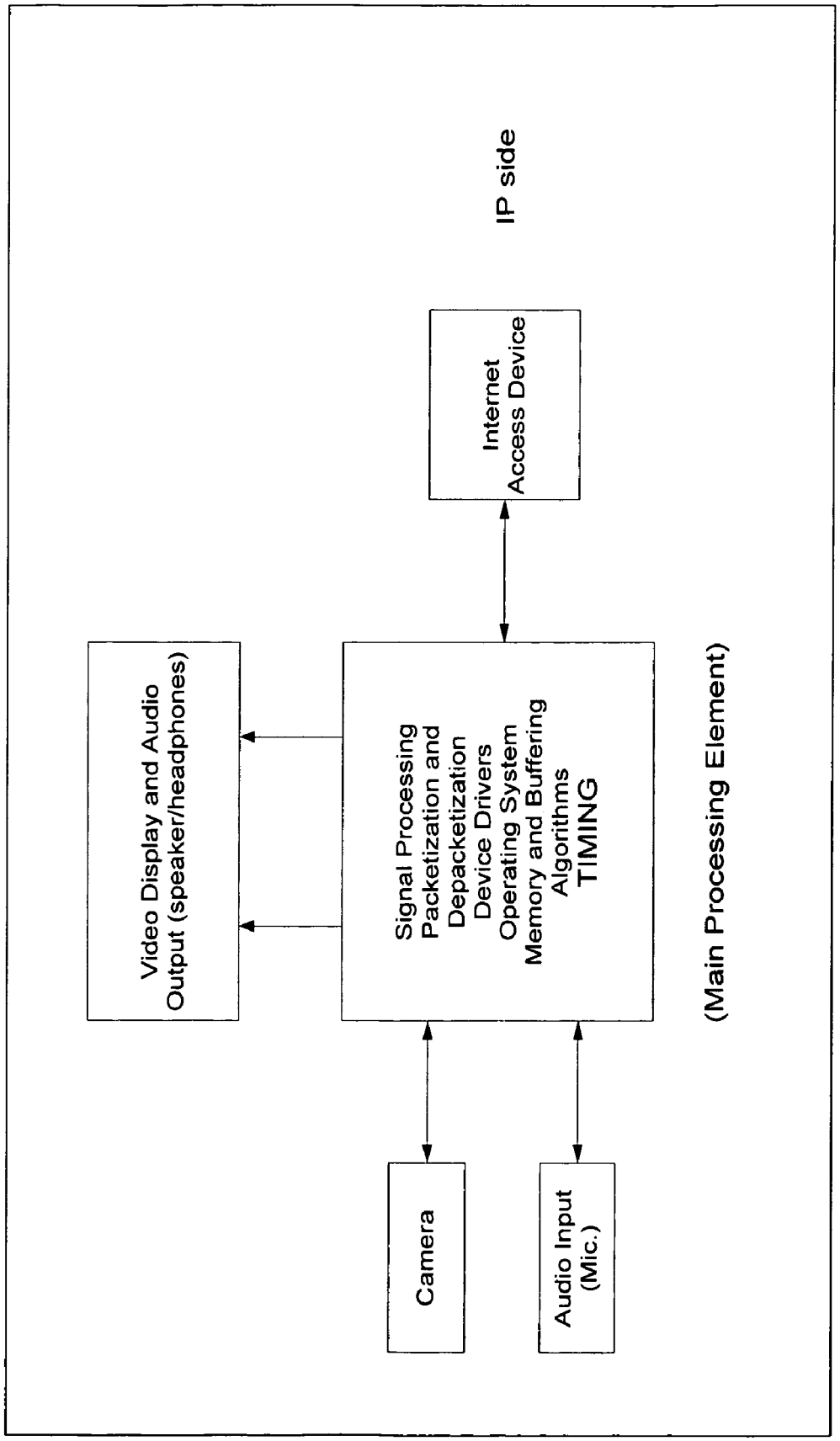
FIG. 1 is a functional block view of key functional elements of the combined voice/video over IP end-user set-up.
Figure 2:
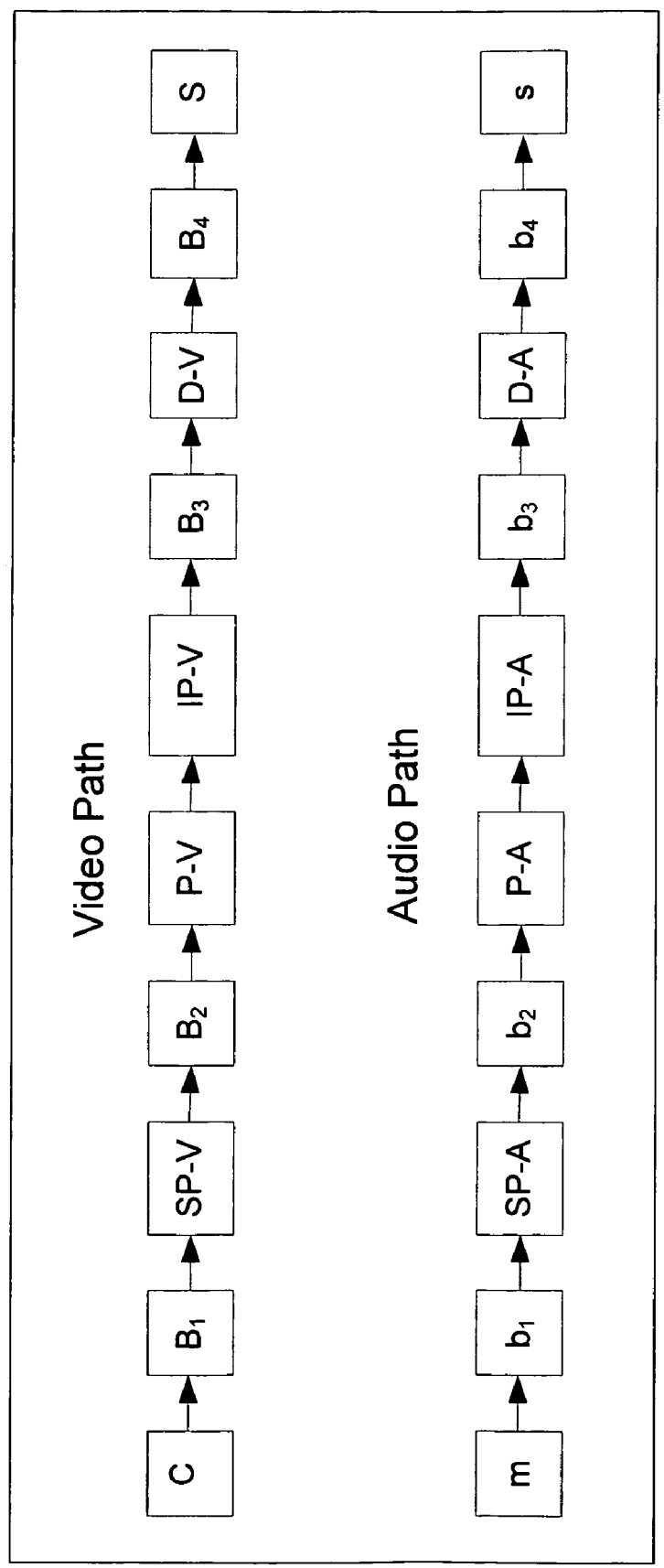
FIG. 2 is a functional block view of elements that add delay in the path between source and sink.
Figure 3:
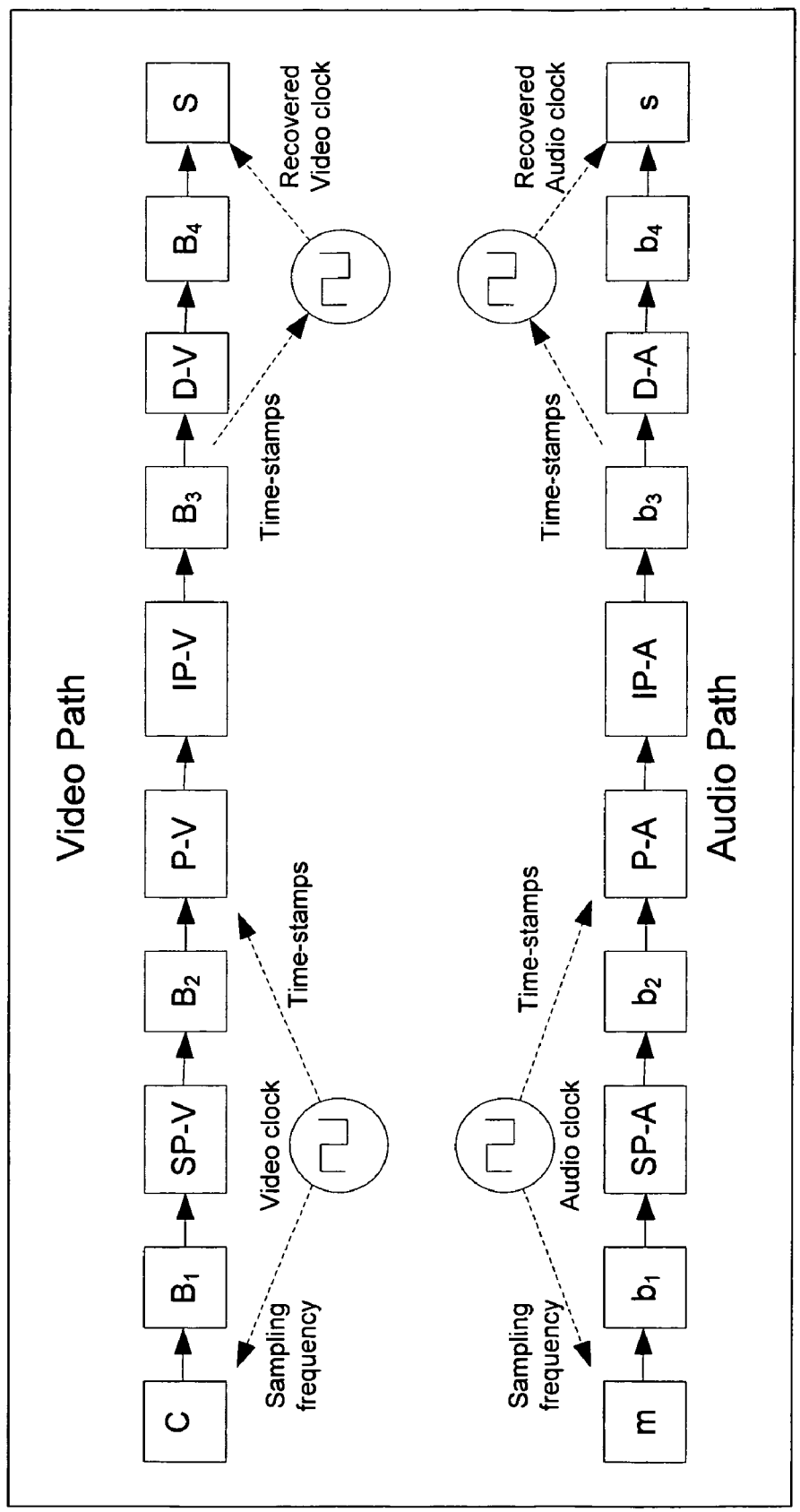
FIG. 3 is a functional block view of application of time-stamps in RTP.
Figure 4:
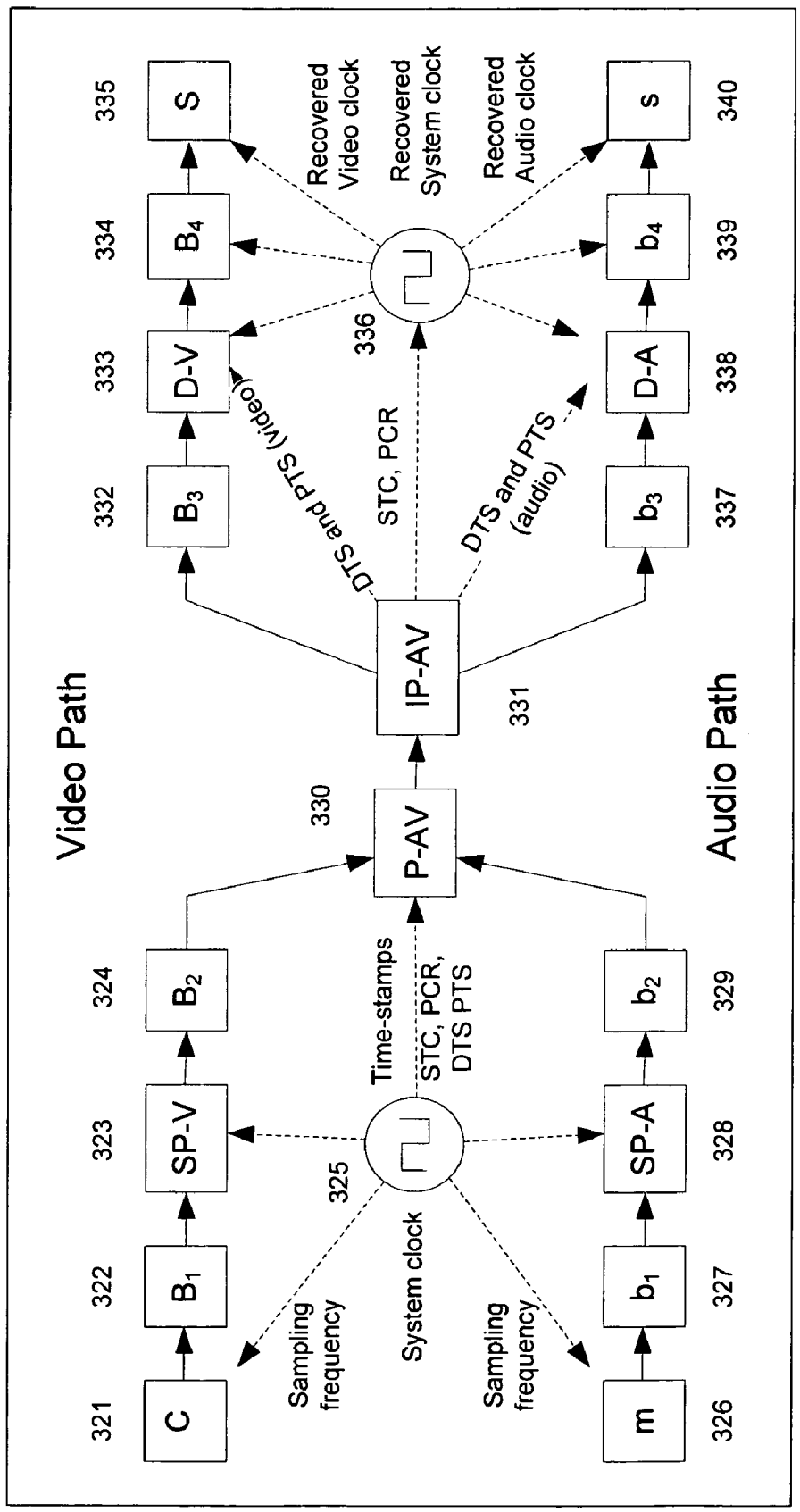
FIG. 4 is a functional block view of application of time-stamps in MPEG-TS (and RTP).

In FIG. 4 it is indicated that the camera/microphone (the conversion devices) are synchronized to the system clock and therefore have a sampling frequency, for clocking the analog-to-digital converter devices, that is tied to the system clock. In practice it is sometimes difficult to ensure this condition and the conversion devices operate on their own time-base that could be slightly different from the system clock.

Referring to FIG. 4, a camera 321 is coupled to a buffer $B_1$ 322 which in-turn is coupled to a signal processor SP-V 323 which in-turn is coupled to a buffer $B_2$ 324 which in turn is coupled to block 330. A system clock 325 is coupled to block 330. A microphone 326 is coupled to a buffer $b_1$ which in-turn is coupled to a signal processor 328 which in-turn is coupled to a buffer $b_2$ which is coupled to the block 330. Block 330 is coupled to block 331 which in-turn is coupled to recover system clock 336. The block 331 is coupled to a buffer $B_3$ 332 which in-turn is coupled to processor 333 which in-turn is coupled to buffer $B_4$ 334 which in turn is coupled to block S 335. The block 331 is coupled to a buffer $b_3$ 337 which in-turn is coupled to processor 338 which in-turn is coupled to buffer $b_4$ 339 which in turn is coupled to block s 340.

The method described here addresses the primary problems with the prior art. In particular, the time-stamp is applied such that the delay differential $\Delta T$ mentioned above is rendered moot.

The method has the advantage in that it retains all the facets of RTP and/or MPEG and is agnostic to the type of signal processing in the codec for the audio and video. That is, the method can be easily adapted into existing implementations of multi-media (i.e., audio and video) platforms including personal computers.

Figure 5:
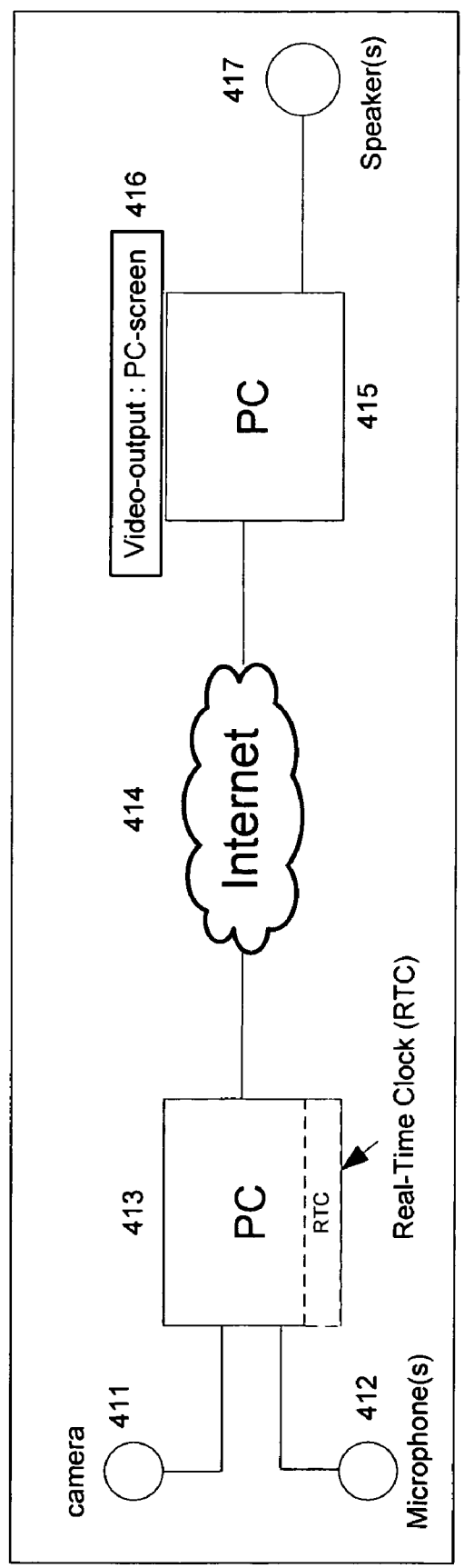
FIG. 5 is a functional block view of an overall Architecture of delivering audio and video over the Internet.

For convenience and specificity we consider a platform analogous to a personal computer (PC). The audio input and output utilize a microphone and speaker that may be built-in or external. Here we assume that the actual microphone and speakers are external but the interface is analog and the conversion from analog-to-digital and from digital-to-analog is achieved in the PC itself using, for example, a "sound-card". The video output is assumed to be the terminal screen of the PC itself. The video input is obtained using a camera that could be external or a built-in option for the PC though here we assume for specificity that the camera is external and the interface between the camera and PC is digital (e.g. USB or FireWire). The overall architecture is depicted in FIG. 5. For convenience the send-side and receive-side are shown as though transmission is in one direction. In actual practice the full-duplex nature of communication implies that each side is actually both "send" and "receive". A personal computer PC 413 is coupled to a camera 411 and microphone(s) 412. The PC 413 communicates via the internet 414 with another PC 415 which in-turn is coupled to speaker(s) 417.

The general operation is as follows:
a. The camera (411) provides the video (image) data in digital form over a conventional digital peripheral connection arrangement such as USB.
b. The microphone (412) converts the sound signal to electrical form and provides the analog audio signal to the PC.
c. The send-side PC (413) includes the following functions:
   i. Buffer the video data from the camera
   ii. Perform the video signal processing (compression function) and create the video elementary stream (MPEG format for compressed video)
   iii. Perform the analog-to-digital conversion for the audio signal (assuming that the microphone provides an analog signal; if the microphone includes A/D conversion then this step is moot)
   iv. Buffer the audio samples (digital format)
   v. Perform the audio signal processing (compression function) and create the audio elementary stream (MPEG format for compressed audio)
   vi. Multiplex the audio and video (compressed format) into MPEG Transport Stream format (assuming that MPEG methods are used for multiplexing)
   vii. Encapsulate the MPEG frames into IP packets following the RTP protocol viii. Launch these RTP packets into the Internet with the appropriate IP addresses in place to allow the packet to reach the destination (receive side)
      ix. The send side PC must have a real time clock function. Whereas it is recommended that this real-time clock be traceable to a network source using either NTP (Network Time Protocol) or PTP (Precision Time Protocol), for the invention disclosed here to function correctly it suffices that the local clock be reasonably stable and reasonably accurate.
   d. The assembled packets are transported over the Internet (414) to the receive-side PC (415). There may be some packet loss, packet reordering, and variable transit delay.
   e. The receive-side PC (415) includes the following functions:
      i. Buffer the incoming IP packets (the jitter buffer function) to identify missing (lost) packets, packet reordering if necessary, and storage (variable delay) to make the Internet transmission delay (almost) constant
      ii. Extract the MPEG frames and demultiplex the elementary streams (video and audio) and extract the appropriate time-stamps (decode time-stamp, DTS, and presentation time-stamp, PTS) for video and audio
      iii. Perform the video signal processing (de-compression function) from the video elementary stream. The decode time-stamp and presentation time stamp permit efficient buffering.
      iv. Perform the audio signal processing (de-compression function) from the audio elementary stream. The decode time-stamp and presentation time stamp permit efficient buffering.
      v. The final buffering prior to actual playout is usually one video-frame for the video signal delivered to the PC screen (there is a trade-off between using buffers at the compressed level and after decompression) and one audio-frame for the audio signal delivered to the D/A converter in the audio subsystem.
      vi. The analog audio signal is delivered to the (external) speakers.

Prior art methods are quite effective at maintaining the alignment at the receive-side. The use of PTS/DTS in MPEG is suitable for ensuring that the receive-side processing and playback will not add much differential delay between the audio and video playback. Maintaining synchronization between the send-side system clock (see 325 in FIG. 4) and the receive-side system clock (see 336 in FIG. 4) is required for the approach of using PTS/DTS for lip-synch. The differential delay ΔT defined above is a measure of (absence of) of lip-synch.

1.1. Buffer B1 (322 in FIG. 4)

The image data from the camera (321 in FIG. 4) must be buffered in order to allow the operation of the camera interface to operate in an autonomous fashion from the encoding signal processing (SP-V) and the multiplexing operation included in P-AV (330 in FIG. 4). However, if the camera clock is synchronized (in frequency) to the system clock, as depicted in FIG. 4, then the buffer memory in B1 can be designed to ensure that there is no overflow or underflow or other loss of data. Typically this involves the use of a "double buffer" involving two "pages" (or blocks) of memory, each page comprising one picture unit or video frame.

The camera scans the image through its lens using either an interlaced or progressive scan (the choice is not material to this invention) to establish a video frame of data that can be viewed as N scan lines (horizontal lines) with M pixels in each line. The chosen video standard determines the number of lines per frame and the number of pixels per line and the frame rate. Typical values for frame rate are 30 frames/sec (fps) and 25 fps. The most common video standards are shown in Table 1, below.

TABLE 1

| Format | Video Resolution | |
| --- | --- | --- |
| | Pixels/line (M) | Lines/frame (N) |
| SQCIF | 128 | 96 |
| QCIF | 176 | 144 |
| CIF | 352 | 288 |
| 4CIF | 704 | 576 |
| 16CIF | 1408 | 1152 |

The current invention is applicable to all these formats and all formats that consider an image to be comprised of a sequence of frames. Currently there are no formats that do not consider an image as a sequence of frames.

Figure 6:
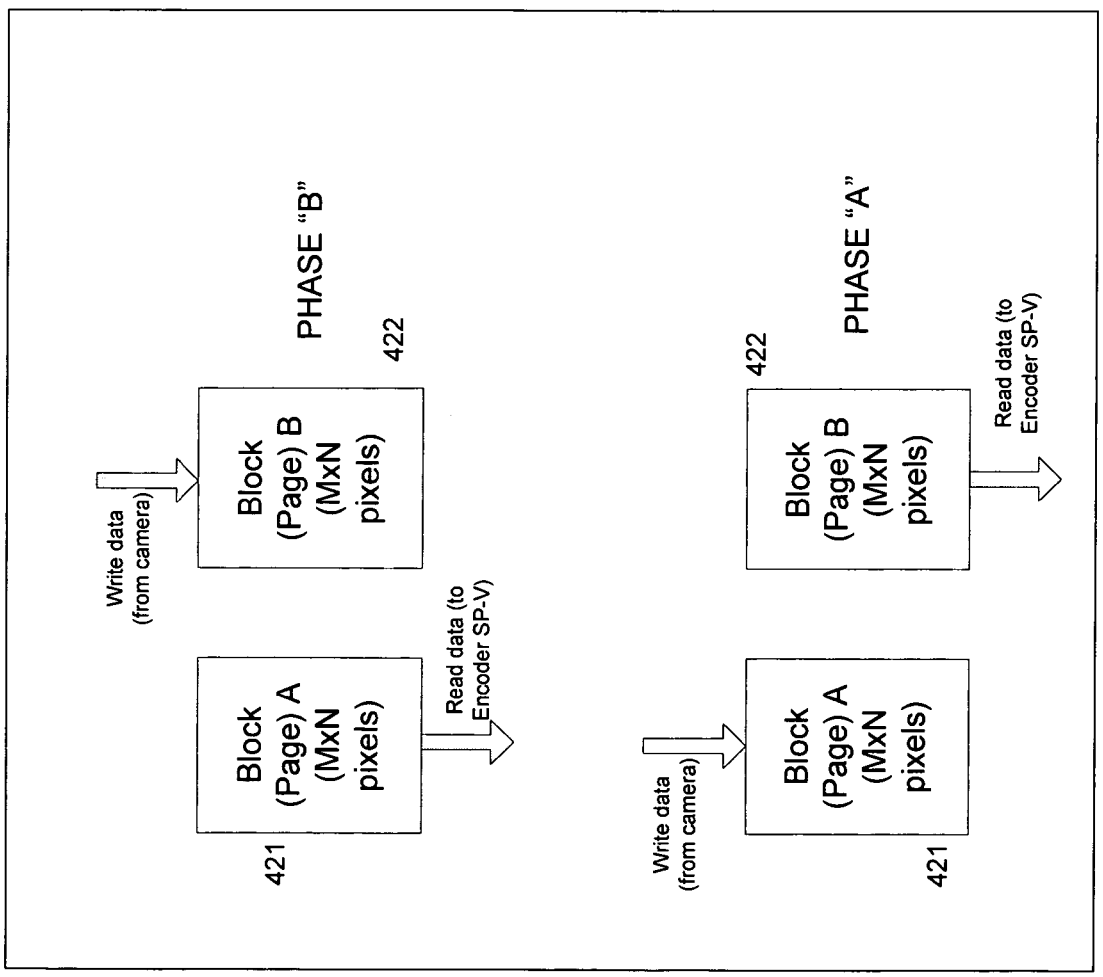
FIG. 6 is a functional block view of a double buffer arrangement in B1.

The double buffer mechanism is depicted in FIG. 6. The double buffer mechanism of FIG. 6 includes a Block (Page) A 421 and a Block (Page) B 422.

The operation of a double buffer arrangement is as follows:
   a. While the data coming from the camera is being written into the block of memory "B", the data related to the previous frame that is in block of memory "A" (421 in FIG. 6) is provided to the signal processing modules for encoding. This is referred to as "Phase B".
   b. After the block of memory "B" (422 in FIG. 6) is filled, the driver module diverts the camera data to the block of memory "A". Implicit is that the data in Block "A" has been delivered to the signal processing module and the memory can be overwritten without loss of data. When the camera driver moves from block "B" to block "A", it provides an indication that block "B" has been filled. This indication can be done by setting/clearing a flag, or by changing the phase of the buffer from "PHASE B" to "PHASE A" (the phase is stored in an appropriate control register), or by invoking a software-interrupt, or all three actions.
   c. In PHASE A the data from the camera is written into memory block "A" while the contents of memory block "B" are delivered to the signal processing module. After memory block "A" has been filled then the driver module provides the "done" indication by clearing/setting a flag, or by changing the phase of the buffer from "PHASE A" to "PHASE B", or by invoking a software-interrupt, or all three actions.

The sequence of events then continues. At start-up or reset it is common to preload the block of memory with "0" (blank image) and initialize the phase state to PHASE A. The key element of the double buffer architecture is that image data (from camera) is written into one block (page) while image data (to encoder) is being read out of the other block (page). Pseudo-code describing the operation is:

For the writing of camera data:

```
IF (phase = PHASE_A)
    {
        Write camera (image) data in Block A;
    }
ELSE IF (phase = PHASE_B)
    {
        Write camera (image) data in Block B;
    }
```

```
ELSE
    {(note that this is an error condition, most likely because "phase" is
    not initialized)
        RECORD ERROR
        Set phase = PHASE_A (arbitrary assignment)
    }
}
```

For the reading out of the image data for the encoder:

```
IF (phase = PHASE_A)
    {
        Read image data for encoder from Block B;
    }
ELSE IF (phase = PHASE_B)
    {
        Read image data for encoder from Block A;
    }
```

Figure 7:
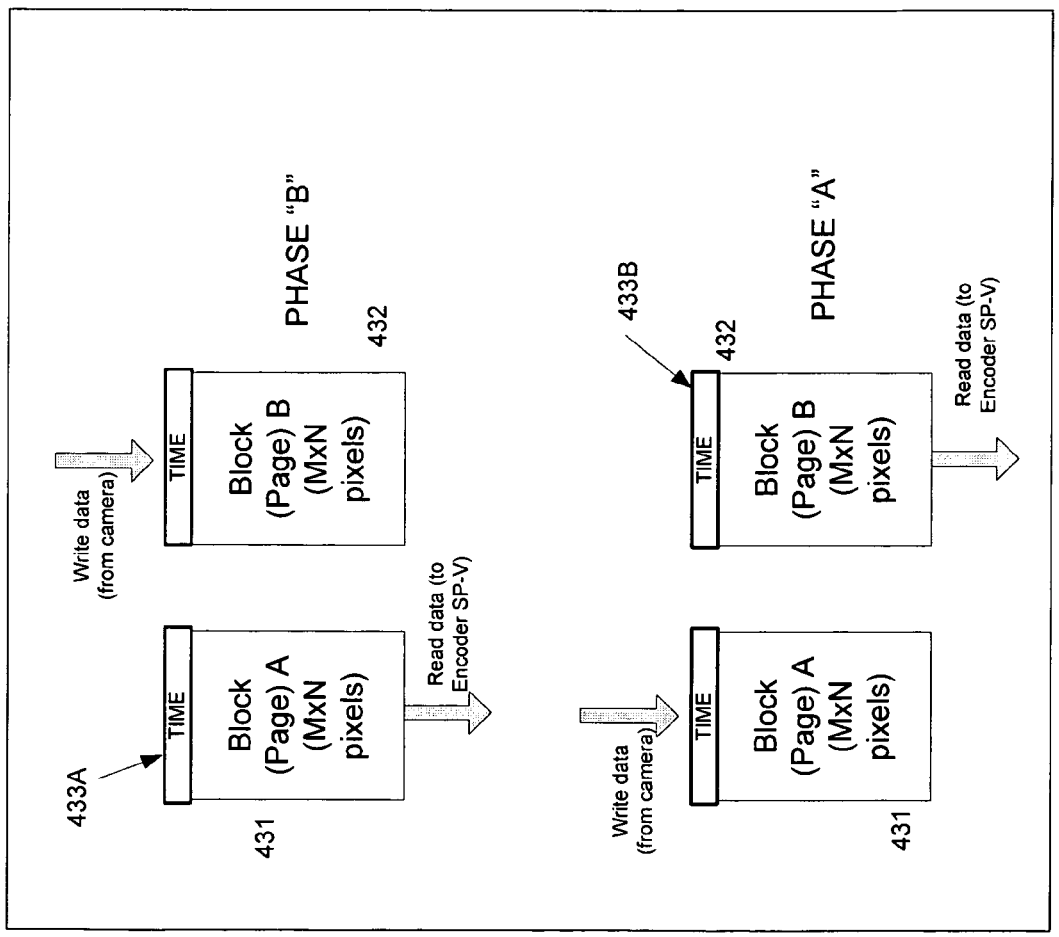
FIG. 7 is a functional block view of a double buffer arrangement in B1 with additional field.

The method proposed to ensure audio-video synchronization is to include an additional item of information that is associated with each of the two blocks A and B. This is depicted in FIG. 7. The double buffer mechanism of FIG. 7 includes a Block (Page) A 431 and a Block (Page) B 432. As depicted in FIG. 7, an additional item of information is associated each block of memory used for holding image data. The memory unit 433A is associated with Block A and 433B is associated with Block B. The specific memory locations used for these items is an implementation detail. The intent of this item is to contain a time-stamp that can be associated with the image frame stored in the block. Consequently it is recommended that the word size be 64 bits so as to be compatible with time-stamp formats used in NTP and PTP (the time protocol formats commonly used).

The manner in which the time-stamp is applied is depicted in the enhanced pseudo-code provided below:

For the writing of camera data:

```
IF (phase = PHASE_A)
    {
        Get System Time from Real Time Clock
        Write System Time into 433A;
        Write camera (image) data in Block A;
    }
ELSE IF (phase = PHASE_B)
    {
        Get System Time from Real Time Clock
        Write System Time into 433B;
        Write camera (image) data in Block B;
    }
ELSE
    {(note that this is an error condition, most likely because "phase" is
    not initialized)
        RECORD ERROR
        Set phase = PHASE_A (arbitrary assignment)
    }
```

For the reading out of the image data for the encoder:

```
IF (phase = PHASE_A)
    {
        Read associated time-stamp from 433B;
        Read image data for encoder from Block B;
    }
```

```
ELSE IF (phase = PHASE_B)
    {
        Read associated time-stamp from 433A;
        Read image data for encoder from Block A;
    }
```

When the image data is read out from the buffer for delivery to the encoder, the associated time-stamp is read out as well. Care must be taken to ensure that subsequent modules have access to the time-stamp associated with the image frame.

Note: If the buffer modules B1 and b1 are in the same machine as the signal processing and multiplexing blocks (SP-V, 323; SP-A, 328; and P-AV, 330) then it is generally feasible to use the System Time Clock (STC) that is associated with the MPEG processing modules instead of the real-time clock (RTC). This is generally advantageous because that guarantees that the time-base for the time-stamps (such as 433A/B) will be the same as the time-base for the MPEG-introduced time-stamps (such as PTS and DTS). However, the method described here allows for the time-base of the real-time clock to be different from the MPEG System Time Clock.

1.2. Buffer b1 (327 in FIG. 4)

The audio data from the microphone (326 in FIG. 4) must be buffered in order to allow the operation of the microphone interface to operate in an autonomous fashion from the encoding signal processing (SP-A, 328 in FIG. 4) and the multiplexing operation (included in P-AV, 330 in FIG. 4). However, if the microphone analog-to-digital conversion clock is synchronized (in frequency) to the system clock, as depicted in FIG. 4, then the buffer memory in b1 can be designed to ensure that there is no overflow or underflow or other loss of data. Typically this involves the use of a "double buffer" involving two "pages" (or blocks) of memory. The audio signal processing is generally achieved in blocks of N samples, the most common blocks being 10 ms blocks and 20 ms blocks. For simplicity we shall assume that the audio is actually speech signals and in this case a common choice of sampling rate is 8 kHz, and each block then contains N=80 samples (10 ms) or N=160 samples (20 ms). With this assumption the terms audio and speech can be used interchangeably.

Figure 8:
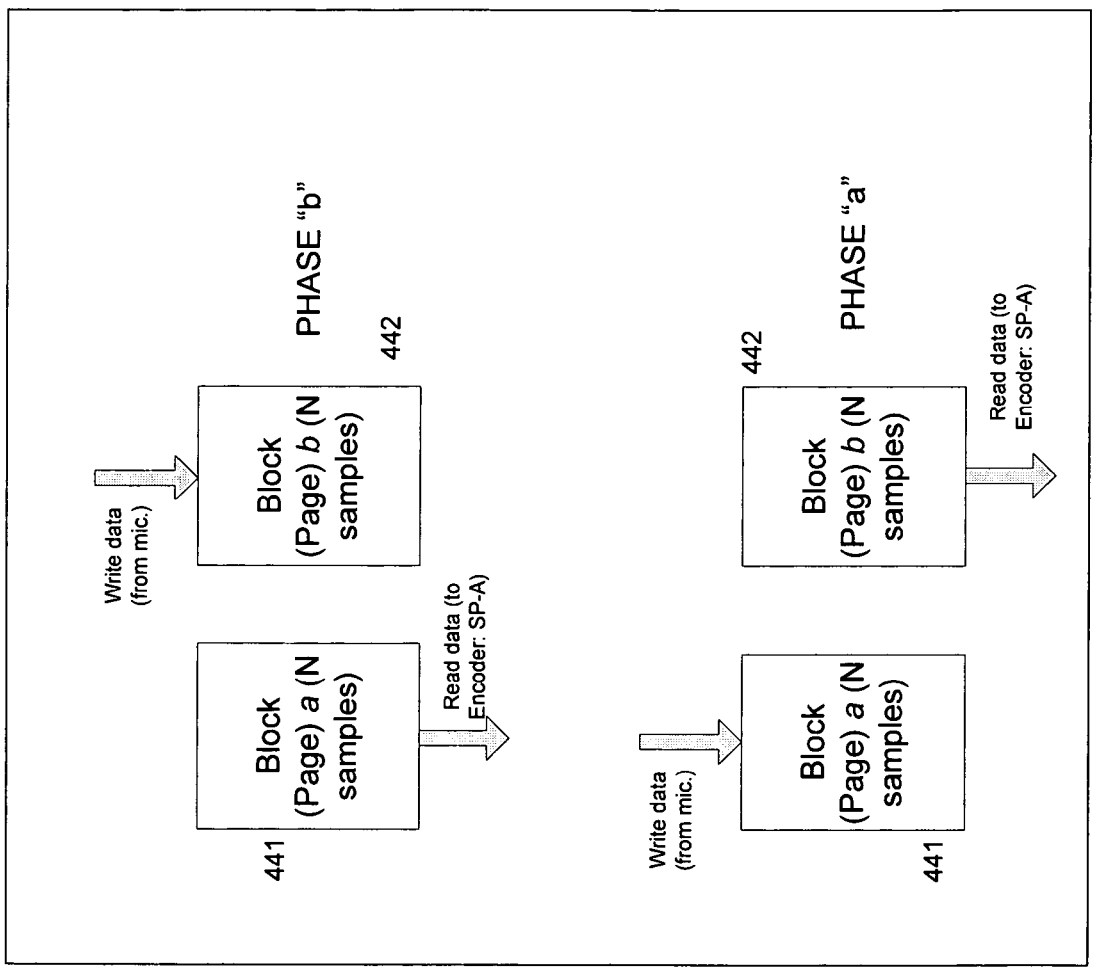
FIG. 8 is a functional block view of a double buffer arrangement in b1.

The double buffer mechanism is depicted in FIG. 8. The double buffer mechanism of FIG. 8 includes a Block (Page) A 441 and a Block (Page) B 442.

The operation of a double buffer arrangement is as follows:
 d. While the data coming from the microphone is being written into the block of memory "b", the data related to the previous frame that is in block of memory "a" (441 in FIG. 8) is provided to the signal processing modules for encoding. This is referred to as "Phase b".
 e. After the block of memory "b" (442 in FIG. 8) is filled, the driver module diverts the audio samples to the block of memory "a". Implicit is that the data in Block "a" has been delivered to the signal processing module and the memory can be overwritten without loss of data. When the camera driver moves from block "b" to block "a", it provides an indication that block "b" has been filled. This indication can be done by setting/clearing a flag, or by changing the phase of the buffer from "PHASE b" to "PHASE a" (the phase is stored in an appropriate control register), or by invoking a software-interrupt, or all three actions.

f. In PHASE a the data from the camera is written into memory block "a" while the contents of memory block "b" are delivered to the signal processing module. After memory block "a" has been filled then the driver module provides the "done" indication by clearing/setting a flag, or by changing the phase of the buffer from "PHASE a" to "PHASE b", or by invoking a software-interrupt, or all three actions.

The sequence of events then continues. At start-up or reset it is common to preload the block of memory with "0" (silence) and initialize the phase state to PHASE a. The key element of the double buffer architecture is that speech samples (from microphone) are written into one block (page) while speech samples (to encoder) are extracted from the other block (page). Pseudo-code describing the operation is:

For the writing of speech samples:

```
IF (phase = PHASE_a)
{
    Write speech samples in Block a;
}
ELSE IF (phase = PHASE_b)
{
    Write speech samples in Block b;
}
ELSE
    {(note that this is an error condition, most likely because "phase" is
    not initialized)
        RECORD ERROR
        Set phase = PHASE_a (arbitrary assignment)
    }
```

For the reading out of the speech samples for the encoder:

```
IF (phase = PHASE_a)
{
    Read speech samples for encoder from Block b;
}
ELSE IF (phase = PHASE_b)
{
    Read speech samples for encoder from Block a;
}
```

Figure 9:
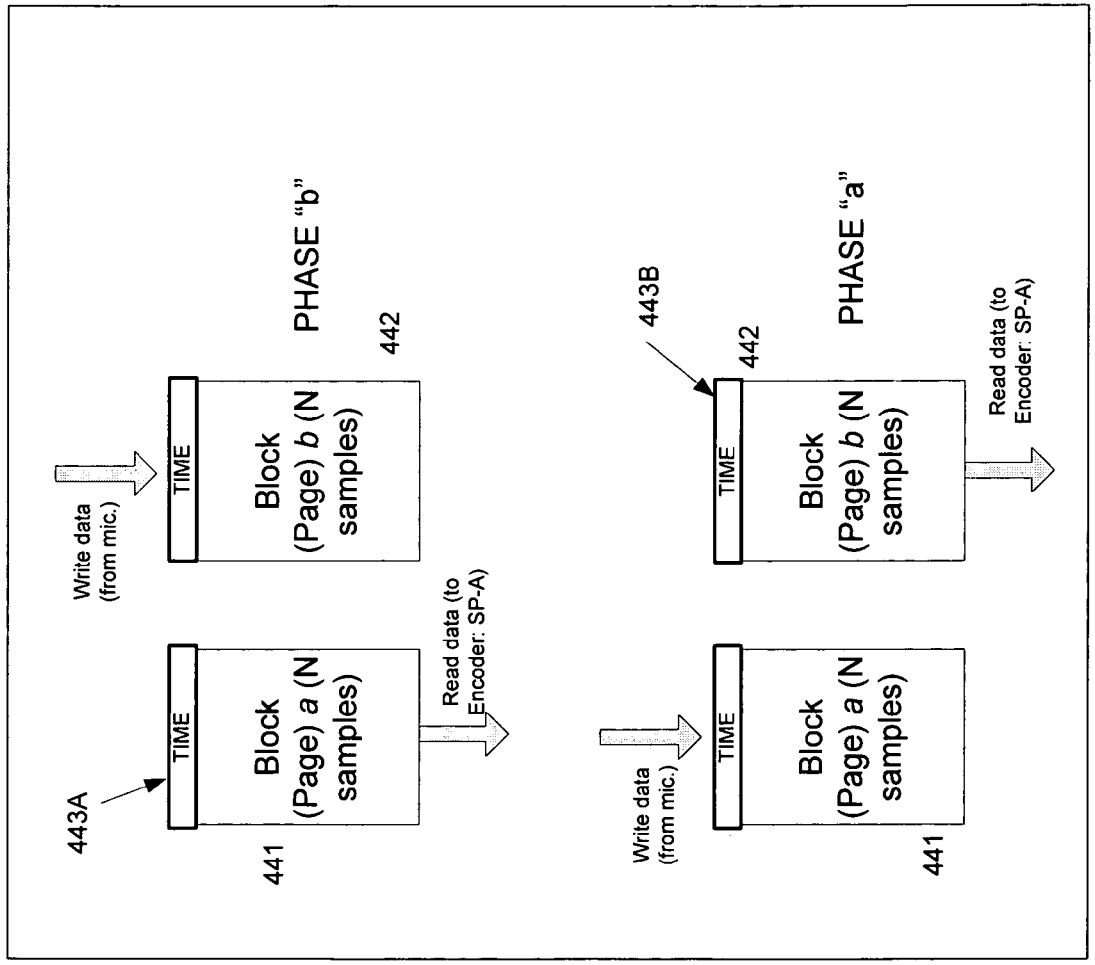
FIG. 9 is a functional block view of a double buffer arrangement in b1 with additional field.

The method proposed to ensure audio-video synchronization is to include an additional item of information that is associated with each of the two blocks a and b. This is depicted in FIG. 9. As depicted in FIG. 9, an additional item of information is associated each block of memory used for holding image data. The memory unit 443A is associated with Block a and 443B is associated with Block b. The specific memory locations used for these items is an implementation detail. The intent of this item is to contain a time-stamp that can be associated with the image frame stored in the block. Consequently it is recommended that the word size be 64 bits so as to be compatible with time-stamp formats used in NTP and PTP (the time protocol formats commonly used).

The manner in which the time-stamp is applied is depicted in the enhanced pseudo-code provided below:

For the writing of audio samples:

```
IF (phase = PHASE_a)
{
    Get System Time from Real Time Clock
    Write System Time into 443A;
    Write camera (image) data in Block a;
}
```

```
ELSE IF (phase = PHASE_b)
{
    Get System Time from Real Time Clock
    Write System Time into 443B;
    Write camera (image) data in Block b;
}
ELSE
    {(note that this is an error condition, most likely because "phase" is
    not initialized)
        RECORD ERROR
        Set phase = PHASE_a (arbitrary assignment)
    }
```

For the reading out of the image data for the encoder:

```
IF (phase = PHASE_a)
{
    Read associated time-stamp from 443B;
    Read image data for encoder from Block b;
}
ELSE IF (phase = PHASE_b)
{
    Read associated time-stamp from 443A;
    Read image data for encoder from Block a;
}
```

When the audio samples are read out from the buffer for delivery to the encoder, the associated time-stamp is read out as well. Care must be taken to ensure that subsequent modules have access to the time-stamp associated with the block of speech (10 ms or 20 ms block).

Note: If the buffer modules B1 and b1 are in the same machine as the signal processing and multiplexing blocks (SP-V, 323; SP-A, 328; and P-AV, 330) then it is generally feasible to use the System Time Clock (STC) that is associated with the MPEG processing modules instead of the real-time clock (RTC). This is generally advantageous because that guarantees that the time-base for the time-stamps (such as 443A/B) will be the same as the time-base for the MPEG-introduced time-stamps (such as PTS and DTS). However, the method described here allows for the time-base of the real-time clock to be different from the MPEG System Time Clock.

Alignment Method

It is assumed that the multiplexing block contained in the block P-AV (330 in FIG. 4) performs the requisite MPEG-TS multiplexing and the packetization of MPEG frames into IP packets in a standardized manner with the appropriate set of presentation time-stamps, decode time-stamps, program clock reference, etc. In this manner the multiplexing allows, theoretically if not practically, for alignment of audio and video paths through the signal processing blocks SP-V and SP-A (323 and 328 in FIG. 4, respectively) and buffers B2 and b2 (324 and 329 in FIG. 4, respectively). Proper alignment of audio and video streams then requires that the buffering blocks B1 and b1 (322 and 327 in FIG. 4) be suitably adjusted to ensure audio-video alignment. The MPEG-TS construction includes the insertion of presentation time-stamps (PTS) and decode time-stamps (DTS) for the audio and video streams. This ensures that the variable delay in the IP network and the various path delays in the receiver side can be compensated for. The crux of the invention is to make these PTS and DTS time-stamps representative of end-to-end delay, essentially solving the lip-synch problem.

The alignment involves introducing an appropriate delay in either the audio or video paths in the modules B1 and/or b1. In order to equalize the delay of the audio and video paths, additional delay has to be introduced into the path that has less delay and this could be either the audio or video path.

Introducing a variable delay can be achieved using a block-level equivalent of a shift register or segmented FIFO (first in first out) buffer (these are terms used to describe the same entity as described below).

Figure 10:
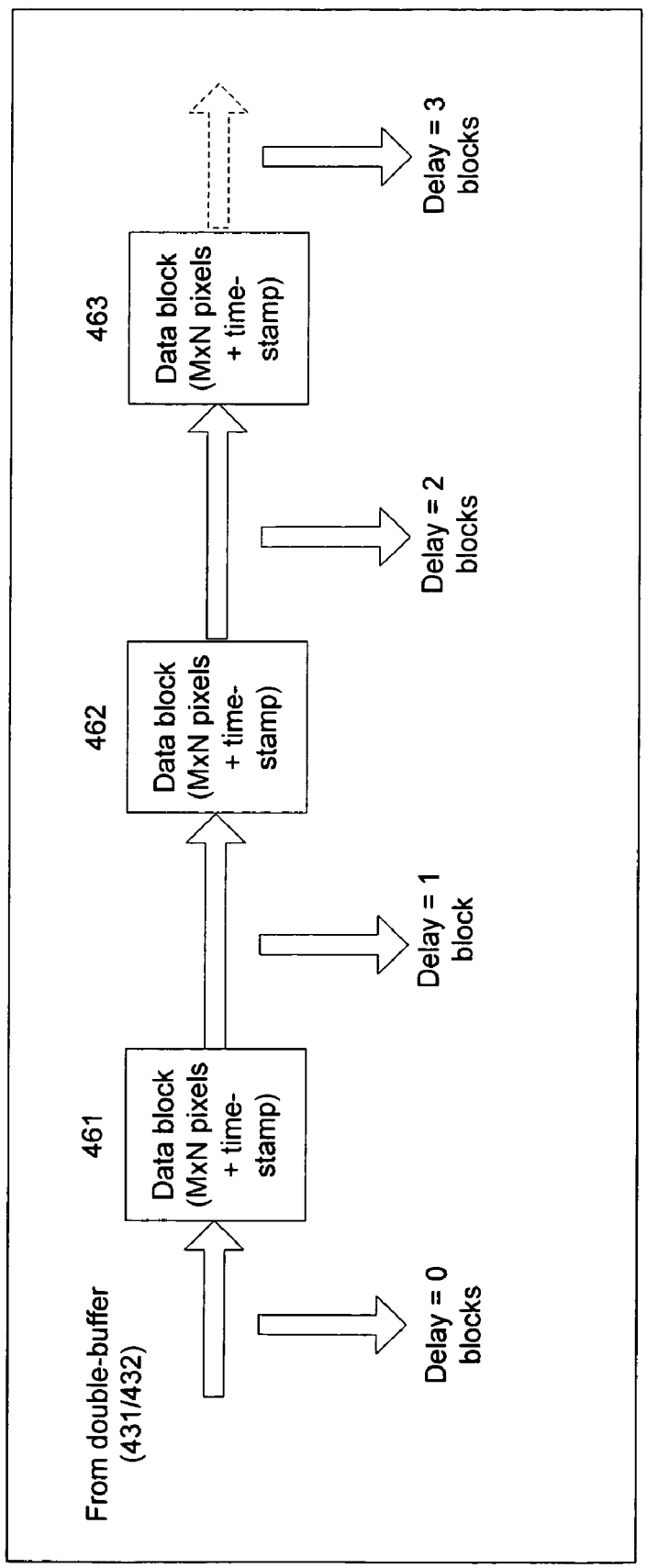
FIG. 10 is a functional block view of a variable delay for video (image) data.

The notion of a variable delay is depicted in FIG. 10. A data block 461 is coupled to a data block 462 which in-turn is coupled to a data block 463. The video data that is read out of the buffer 431/432 (in FIG. 7) for delivery to the encoder is written, as a block (with time-stamp) into the block-level shift register. That is, the entire data block in 462 is written into block 463, the contents of block 461 is written into block 462, and the data from the double-buffer (431/432) is written into block 461. In the figure only three blocks are depicted. More blocks can be included provided there is adequate memory. In practice it is very unlikely that the video stream must be delayed by more than three blocks.

Figure 11:
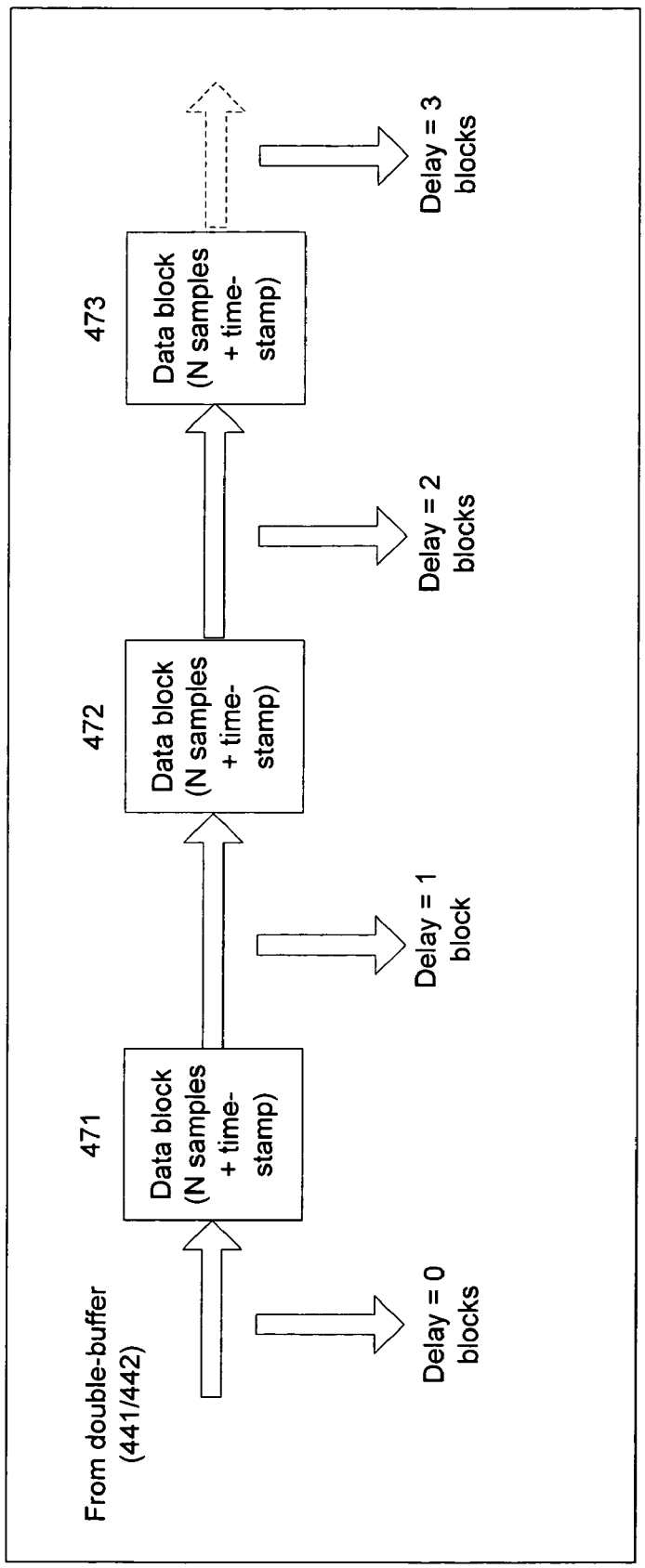
FIG. 11 is a functional block view of a variable delay for audio (speech) data.

The notion of variable delay is the following. To have a delay of 0 blocks, the data from the double-buffer is presented to the encoder; to have a delay of 1 block, the data from block 461 is presented to the encoder; to have a delay of 2 blocks, the data from block 462 is presented to the encoder; and so on. Since each block comprises one video frame, the time duration equivalent of one block is frame-rate dependent. For a frame rate of 30 fps, each block is nominally 33.33 ms. The audio data that is read out of the buffer 441/442 (in FIG. 7) for delivery to the encoder is written, as a block (with time-stamp) into the block-level shift register. FIG. 11 illustrates a data block 471 coupled to a data block 472 which in-turn is coupled to a data block 473. The entire data block in 472 is written into block 473, the contents of block 471 are written into block 472, and the data from the double-buffer (441/442) is written into block 471. In FIG. 11 only three blocks are depicted. More blocks can be included provided there is adequate memory. In practice it is very unlikely that the video stream must be delayed by more than three blocks but it is quite possible that the audio stream must be delayed by more than 3 blocks.

The notion of variable delay is the following. To have a delay of 0 blocks, the data from the double-buffer is presented to the encoder; to have a delay of 1 block, the data from block 471 is presented to the encoder; to have a delay of 2 blocks, the data from block 472 is presented to the encoder; and so on. Since each block comprises N samples of speech (audio) data, if the sampling rate is 8 kHz and N=80, each block is equivalent to 10 ms.

The basis of the invention is to determine:
a. Which stream (audio or video) must be delayed by an additional amount using the variable delay mechanism; and
b. How much delay should be introduced. This is done by choosing which leg of the block-level shift register should be used to extract data going to the encoder(s) (SP-V and SP-A).

Note that there is coarse quantization regarding the amount of additional delay introduced. In the examples cited, the additional delay for the video stream is in quanta of 33.33 ms; the additional delay for audio is in quanta of 10 ms. However, it should be further noted that the human response system will not detect a lack of lip-synch if the differential delay is less than (approximately) 40 ms.

Note also that if the delay value is changed there will be a discontinuity. For example, if the delay is changed from n blocks to (n±1) blocks, either one block will be repeated or one block will be deleted. Consequently it is advisable to not change the delay value any more often than is absolutely necessary. For notational convenience we shall refer to the time-value associated with one block to be $T_V$ for the video block and $T_A$ for the audio block. In the examples cited $T_V$=33.333 ms and $T_A$=10 ms.

Alignment Algorithm and Implementation

The alignment method involves executing the following algorithm on the processor of the platform. The algorithm that can be implemented in software as a function is described below. The MPEG multiplexing block introduces presentation time-stamps (decode time-stamps will be just as applicable) into the MPEG-TS to indicate when the presentation (of the current video/audio unit of information) should occur in the receiver. These are routinely introduced into the MPEG-TS. Denote by PTSV(n) the $n^{th}$ insertion of PTS for the video and by PTSA(m) the $m^{th}$ insertion of PTS for audio (the index of the PTS is to indicate the progression in time as done for a digital signal).

Denote by TSV(n) the time-stamp (433A/433B) that is associated with the video unit of information for which PTSV(n) is the associated presentation time-stamp. Likewise, denote by TSA(m) the time-stamp (443A/443B) that is associated with the audio unit of information for which PTSA(m) is the associated presentation time-stamp. The index notation for the audio and video presentation time-stamps is different because the rates at which presentation time-stamps are introduced could be different for the audio and video streams.

It is quite straightforward to scale the time-stamps so that the value represented has the units of time (e.g. ms). It is also quite straightforward to ensure that the number system is capable of representing the range of time values associated with the various time-stamps. It is assumed that this scaling has been done, if necessary.

The underlying principle of the alignment method is to keep $$\Delta_V = \langle (PTSV(n) - TSV(n))\rangle \approx \langle (PTSA(m) - TSA(m))\rangle = \Delta_A \quad \text{(Eq. 4.1)}$$

Where ≈ indicates approximate equality and the angular brackets represent a time average.

In Eq. 4.1 the quantities $\Delta_V$ and $\Delta_A$ are shown as though they are a constant. In practice, because of frequency offsets and clocks running asynchronously to each other, the short term average could have a slowly varying behavior.

Pseudo code for the maintenance of $\Delta_V$ is provided below. The intention is that $\Delta_V$ is computed as the average of the last K differences. A typical value of K is 100. When a new PTSV and associated TSV are generated by the software that is implementing the MPEG-TS multiplexing, these values are provided to the following code:

```
VDiff_new = PTSV(n) - TSV(n)   //compute difference of PTSV
    and TSV
//Assume that the array VDiff[ ] contains the last K values of the
difference of PTSV and TSV
    For i = (K-1), (K-2),....,1
    { VDiff[i] = VDiff[i-1]; } // bump the past values of Diff
        // by using the array like a "delay line"
    VDiff[0] = VDiff_new // most recent value goes in array location
    "0"
        // (the first location)
    Δ_V = (1/K)·(VDiff[0] + VDiff[1] + ... +VDiff[K-1]) // Δ_V is the
    average
```

This code is executed every time a (video) presentation time-stamp is generated. The code provided above is appropriate after K PTS values have been provided. At start-up, and until K PTS values have been provided, $\Delta_V$ is computed as the average of the K1(<K) values of the difference from the K1 values of PTSV (and TSV) provided.

There is a similar situation for the audio portion. Pseudo code for the maintenance of $\Delta_V$ is provided below. The intention is that $\Delta_V$ is computed as the average of the last k differences. A typical value of k is 100. When a new PTSA and associated TSA are generated by the software that is implementing the MPEG-TS multiplexing, these values are provided to the following code:

```
ADiff_new = PTSA(n) – TSA(n)   //compute difference of PTSA
    and TSA
//Assume that the array ADiff[ ] contains the last k values of the
difference of PTSA and TSA
    For i = (k-1), (k-2),....,1
    { ADiff[i] = ADiff[i-1]; } // bump the past values of Diff
        // by using the array like a "delay line"
    ADiff[0] = ADiff_new // most recent value goes in array location
"0"
        // (the first location)
    Δ_A = (1/k)·(ADiff[0] + ADiff[1] + ... +ADiff[k-1]) // Δ_A is the
        average
```

This code is executed every time a presentation time-stamp (audio) is generated. The code provided above is appropriate after k PTS values have been provided. At start-up, and until k PTS values have been provided, $\Delta_A$ is computed as the average of the k1(<k) values of the difference from the k1 values of PTSA (and TSA) provided.

The MPEG standard requires that PTS values be inserted a rate such that there is never more than 0.7 s between timestamps. Thus 100 PTS values translate to a time interval of approximately 70 s or less.

The method of alignment can be expressed in the following manner:

At start-up both the audio and video variable delays are set for 0 blocks and so maintained until ≧L (a suitable value for L is 10) PTSV values and ≧L PTSA values have been received.

After that, every minute the following procedure is followed:

```
If Δ_V > Δ_A : // this implies that additional delay must be included in the
audio path
    {
        Compute d_A = integer( (Δ_V – Δ_A)/T_A);
        d_A is the delay (in blocks) that must be set for the audio variable
            delay
        the video delay should be 0 blocks
    }
If Δ_A > Δ_V : // this implies that additional delay must be included in the
video path
    {
        Compute d_V = integer( (Δ_A – Δ_V)/T_A);
        D_V is the delay (in blocks) that must be set for the audio variable
            delay
        the audio delay should be 0 blocks
    }
```

In the description above, the notion of integer( ) is that of finding the largest integer less than or equal to the argument.

DEFINITIONS

The term program and/or the phrase computer program are intended to mean a sequence of instructions designed for execution on a computer system (e.g., a program and/or computer program, may include a subroutine, a function, a procedure, an object method, an object implementation, an executable application, an applet, a servlet, a source code, an object code, a shared library/dynamic load library and/or other sequence of instructions designed for execution on a computer or computer system).

The term substantially is intended to mean largely but not necessarily wholly that which is specified. The term approximately is intended to mean at least close to a given value (e.g., within 10% of). The term generally is intended to mean at least approaching a given state. The term coupled is intended to mean connected, although not necessarily directly, and not necessarily mechanically. The term proximate, as used herein, is intended to mean close, near adjacent and/or coincident; and includes spatial situations where specified functions and/or results (if any) can be carried out and/or achieved. The term distal, as used herein, is intended to mean far, away, spaced apart from and/or non-coincident, and includes spatial situation where specified functions and/or results (if any) can be carried out and/or achieved. The term deploying is intended to mean designing, building, shipping, installing and/or operating.

The terms first or one, and the phrases at least a first or at least one, are intended to mean the singular or the plural unless it is clear from the intrinsic text of this document that it is meant otherwise. The terms second or another, and the phrases at least a second or at least another, are intended to mean the singular or the plural unless it is clear from the intrinsic text of this document that it is meant otherwise. Unless expressly stated to the contrary in the intrinsic text of this document, the term or is intended to mean an inclusive or and not an exclusive or. Specifically, a condition A or B is satisfied by any one of the following: A is true (or present) and B is false (or not present), A is false (or not present) and B is true (or present), and both A and B are true (or present). The terms a and/or an are employed for grammatical style and merely for convenience.

The term plurality is intended to mean two or more than two. The term any is intended to mean all applicable members of a set or at least a subset of all applicable members of the set. The phrase any integer derivable therein is intended to mean an integer between the corresponding numbers recited in the specification. The phrase any range derivable therein is intended to mean any range within such corresponding numbers. The term means, when followed by the term "for" is intended to mean hardware, firmware and/or software for achieving a result. The term step, when followed by the term "for" is intended to mean a (sub)method, (sub)process and/or (sub)routine for achieving the recited result. Unless otherwise defined, all technical and scientific terms used herein have the same meaning as commonly understood by one of ordinary skill in the art to which this invention belongs. In case of conflict, the present specification, including definitions, will control.

CONCLUSION

The described embodiments and examples are illustrative only and not intended to be limiting. Although embodiments of the invention can be implemented separately, embodiments of the invention may be integrated into the system(s) with which they are associated. All the embodiments of the invention disclosed herein can be made and used without undue experimentation in light of the disclosure. Although the best mode of the invention contemplated by the inventor(s) is disclosed, embodiments of the invention are not limited thereto. Embodiments of the invention are not limited by theoretical statements (if any) recited herein. The individual steps of embodiments of the invention need not be performed in the disclosed manner, or combined in the disclosed sequences, but may be performed in any and all manner and/or combined in any and all sequences.

Various substitutions, modifications, additions and/or rearrangements of the features of embodiments of the invention may be made without deviating from the spirit and/or scope of the underlying inventive concept. All the disclosed elements and features of each disclosed embodiment can be combined with, or substituted for, the disclosed elements and features of every other disclosed embodiment except where such elements or features are mutually exclusive. The spirit and/or scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

REFERENCES

[1] *RTP: A Transport Protocol for Real-Time Applications*, RFC 1889, IETF, January 1996.

[2] *Information technology—Generic coding of moving pictures and associated audio information: Systems*. ISO-IEC 13818-1, December 2000.

What is claimed is:

1. A method, comprising synchronizing audio and video streams including
    applying a time-stamp to a block of a audio buffer in an audio path;
    applying a time-stamp to a block of a video buffer in a video path;
    reading the block from the audio buffer;
    reading the block from the video buffer; and
    aligning the audio path and the video path by introducing a variable delay to one member selected from the group consisting of the audio path or the video path to substantially equalize the end-to-end delay of both the audio path and the video path.

2. The method of claim 1, wherein the variable delay is a multiple of a block-level equivalent of a shift register.

3. The method of claim 1, wherein the variable delay is a multiple of a block-level equivalent of a segmented first-in first-out buffer.

4. The method of claim 1, wherein the block from the audio buffer includes one audio sample.

5. The method of claim 1, wherein the block from the video buffer includes one video frame.

6. The method of claim 1, further comprising changing the variable delay.

7. The method of claim 6, wherein changing includes calculating an average of previous differences.

8. The method of claim 1, wherein time-stamps applied to the block of audio and block of video are established using a real-time clock.

9. The method of claim 8, wherein a real-time-clock is synchronized to a global reference.

10. The method of claim 9, wherein the real-time-clock is synchronized to UTC over a packet-network using NTP or PTP.

11. The method of claim 10, wherein a real-time-clock at a receiver is synchronized to a same global reference as a real-time-clock at a transmitter.

12. An apparatus, comprising: a digital to analog convertor for synchronizing audio and video including
    an audio buffer in an audio path, each block of the audio buffer having an audio time-stamp; and
    a video buffer in a video path, each block of the video buffer having a video time-stamp,
    wherein the audio path and the video path are aligned by introducing a variable delay to one member selected from the group consisting of the audio path or the video path to substantially equalize the end-to-end delay of both the audio path and the video path.

13. The apparatus of claim 12, wherein the audio buffer includes a double buffer.

14. The apparatus of claim 12, wherein the audio buffer includes a circular buffer.

15. The apparatus of claim 12, wherein the audio buffer includes a linear buffer.

16. A digital switched network integrated access device, comprising the apparatus of claim 12.

* * * * *